United States Patent Office 2,848,651
Patented Aug. 19, 1958

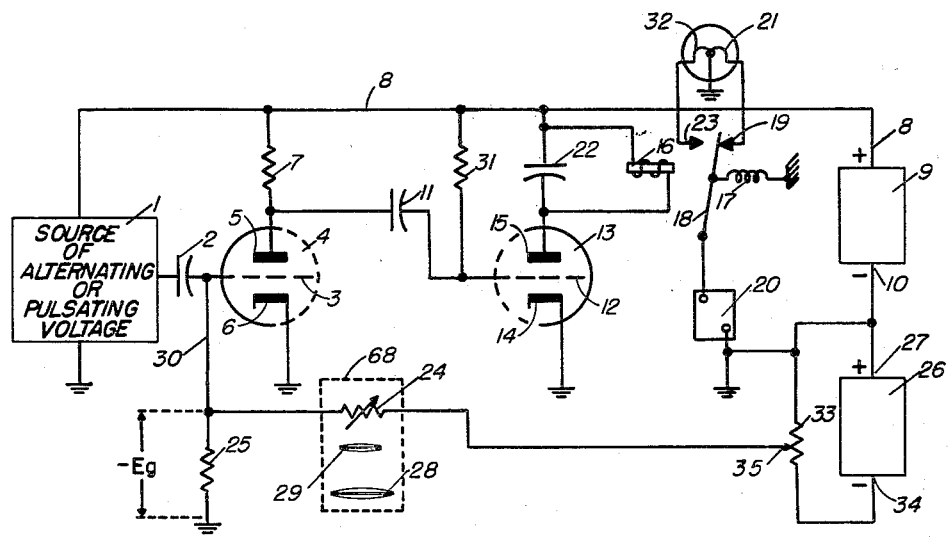
FIG.1
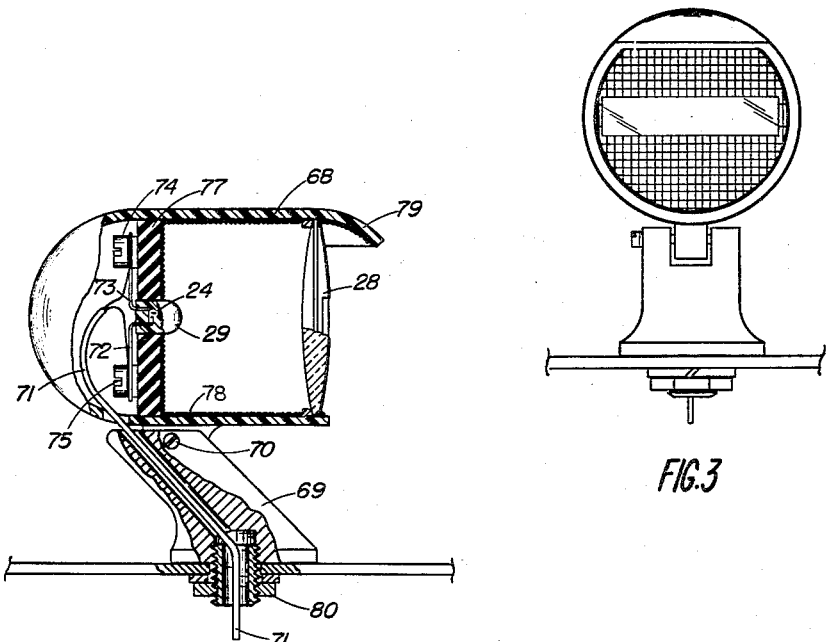
FIG.2
FIG.3
INVENTOR.
GEORGE C. BYRNE

2,848,651

AUTOMATIC HEADLIGHT DIMMING DEVICE

George C. Byrne, Southbridge, Mass.

Application October 20, 1955, Serial No. 541,671

1 Claim. (Cl. 315—83)

This invention relates to an improved mechanism for automatically dimming the headlights of an automobile, or other vehicle, in response to the light from a vehicle approaching in the opposite direction.

In the past, many systems have been devised for automatically controlling the headlights of an automobile actuated by the lights from on-coming traffic. However, none has received widespread acceptance by the automotive industry. The primary reason is that because of their complexity they cannot be economically produced to meet the existing demand for a low cost dimmer device. Also because of their complexity, their many component parts and inter-related intricate circuits constitute a safety hazard. Coupled with delicate adjustments offering many vulnerable points for operational failure, these prior art devices have not come into wide use despite the serious problem involved in traffic safety.

In manual dimming of automobile headlights, it is correct procedure for dimming to take place at a point before the lights from the two approaching vehicles are in such a position and of such an intensity that they would otherwise create a safety hazard by causing the drivers to become dazzled. The distance between the two automobiles, on a straight and level highway, at which dimming should take place is generally recognized to be approximately 1500 feet.

Many prior art automatic dimmers proposed employ photoelectric tube detectors of the electron multiplier type to provide the sensitivity required to detect the on-coming headlights at the recognized distance of 1500 feet. The employment of these detectors, however, present many disadvantages. Their sensitivity is dependent upon the respective amplification of each dynode stage, and there being many stages, minute variations per stage in amplification produce very large changes in over-all tube sensitivity. Very large variations in individual characteristics for one particular type result. Furthermore, unless elaborate measures are taken to regulate the voltage applied to these tubes, they become unstable. Also, when voltages of the correct magnitude to give the required sensitivity are applied to these tubes, exposure to relatively greater intensities of light such as close-by automobile headlights render them less sensitive to the distant headlights of another automobile immediately following. These tubes, being complex in nature, are relatively expensive and their use as detectors greatly increases the over-all cost of the dimmer device.

Other proposed devices employ simple photo-emissive tubes. The sensitivity of these tubes being well below that of the photo-multiplier variety, their outputs have to be amplified to a value where they were capable of actuating a relay.

The methods employed to amplify the output of these simple photo-tubes were: (1) amplification of the direct current output by means of direct current amplifiers; (2) amplification of pulses which were a function of the light intensity on the tube. These pulses are provided by some method of interrupting the steady output of the tube, and then employing alternating current amplification methods.

The disadvantages of employing the first method of amplification are well known to those skilled in the art, such amplifiers being susceptible to minute variations in component part characteristics, voltage variations, and so on.

The method #2 overcomes those defects to some degree by employing alternating current amplification techniques. In dimmer applications however, this suffers the defect that in order to provide the sensitivity required, great amplification is necessary. Because of the intense engine ignition interference field and the interference produced by the vibrator power supply, signal lights, etc., elaborate shielding is required, and this still does not eliminate the possibility of pick up of electrical noise from outside sources. The relay actuating circuits are arranged to distinguish a predetermined magnitude of pulse, and being unable to recognize a "true" pulse (resulting from photoelectric action) from an "untrue" pulse (resulting from electrical interference), an increase in the electrical interference acting on the system can accomplish the same results as a pulse of the correct magnitude.

A further disadvantage associated with these systems is that they provided for a continuum of operation. That is, the output is a replica of the input. To insure consistent operation, it is required that the relay employed have excellent repeatability of pull-in and drop-out current. Obviously, under varying temperature conditions, this consistency is difficult if not impossible to attain. It is also obvious that the relay current percentage differential should be at least equal to the percentage differential of the actuating voltage. Consequently in this form of circuit the relay should be more "change" sensitive than the circuit of which it is a component, but to accomplish this, the cost is increased.

None of the earlier devices are versatile enough to be operated from the various power systems in use in automobiles. Many require that the positive terminal of the automobile battery be at ground potential, while others require that the negative terminal of this battery be at ground potential. Also, they cannot be transferred or installed in automobiles having a different voltage system, and both 6 and 12 volt D. C. systems are in common use at the present time.

The objects of this invention include the provision of an automatic headlight dimming apparatus which is simple in design, comprises a minimum of component parts, and yet has the inherent sensitivity and stability to insure reliable operation over a long period of time.

A further object of the invention is the provision of an automatic headlight dimming apparatus which may be operated from either a 6- or a 12-volt automobile primary voltage supply system.

Another ebject of the invention is the provision of electronic circuitry the operation of which is relatively independent of variations in the characteristics of individual circuit elements, noise and variations in primary supply voltage.

Other objects and advantages of the invention will appear hereinafter.

Reference is to be had to the accompanying drawings, in which:

Fig. 1 is a circuit diagram showing the invention;

Fig. 2 is a section through the signal pick-up unit of the device; and

Fig. 3 is a front view of the signal pick-up unit of the device.

Referring to Fig. 1, it will be seen that the new circuit comprises two sources of high D.-C. potential as shown at 9 and 26. Source 9 has its negative terminal 10 at ground potential. Source 26 has its positive terminal 27 at ground potential. In practice, these two sources are obtained by employing a common-ground voltage double circuit at the output of a vibrator type power supply energized off the automobile primary supply.

Source of potential 9 provides positive potential for the plates of tubes 4 and 13 as well as the grid 12 of tube 13 and source of alternating or pulsating voltage 1. These connections originate on wire-lead 8 which is the high-positive potential lead of the system.

Source of potential 26 provides negative bias potential for the grid 3 of tube 4. The full value of potential across source 26 is applied to potentiometer 33. By adjusting tap 35 of potentiometer 33, it is possible to adjust the value of negative potential $-Eg$ applied to grid of tube 4.

Source of alternating or pulsating voltage 1 is provided in practice by a neon-tube relaxation oscillator. It may also be a generator of A. C. voltage, in which case, however, only the positive half-cycles of voltage would be used in the operation of the system.

A photo-conductive element 24 is mounted inside housing 68. An optical system is also mounted in this housing. The optical system comprises objective lens 28 and field lens 29. The latter may in practice be of the plastic molded type and permanently attached to the photo-conductive element. The object of the lens system is to collect and concentrate the light flux received from an on-coming automobile's headlights on the sensitive element.

A potential divider, comprising photo-conductive element 24 and resistor 25, is connected between the tap 35 of potentiometer 33 and ground. Negative bias potential for grid 3 of tube 4 is developed across resistor 25 due to the IR drop across this resistor.

The operation of the circuit is dependent upon the characteristic of photo-conductors that the degree increase in conductivity of these elements when they are exposed to light is proportional to the intensity value of the light incident upon the sensitive crystal. There is a certain advantage to employing the degree-conductivity change rather than the values of conductivity which result from various degrees of light intensity. Photo-conductive crystals have, as manufactured, wide differences in impedance. If they have equal sensitivity, degree in change in conductivity, it is possible to utilize this sensitivity to the fullest by simply adjusting potentiometer 35.

In operation, tap 35 of potentiometer 33 is adjusted so that the value of $-Eg$, the negative bias applied to the grid 3 of tube 4, is high enough to cut-off tube 4, when photo-conductor 24 is dark. Tube 4, however, is able to conduct each time a positive pulse is applied to grid 3 through pulse peaking and coupling capacitor 2 from pulse source 1.

When a certain value of light intensity is incident on photo-conductor 24, or when it is dark and the tap of potentiometer 33 is adjusted as described above, positive pulses delivered from source 1, open and close tube 4 at the frequency of the pulsations. Tube 4 may also be closed by an adjustment of potentiometer 33 or by an increase in the conductivity of photo-conductor 24.

It is obvious, assuming constant value for pulses from source 1, that higher than cut-off or lower than cut-off values of $-Eg$, except over a small range, will be ineffective in the operation of tube 4.

For two values of light intensity incident on photo-conductor 24, it can therefore be seen that tube 4 has two stable states. In one state it is pulsed open periodically by the action of the positive pulses applied to its grid. This is the state for one value of light intensity; the lower intensity. In the second state, when the incident light reaches the higher intensity, tube 4 is closed.

The remaining part of the circuit, including relay coil 16 and its armature 18, which is employed to switch the headlight filaments, is influenced by whether or not the tube 4 is being pulsed open periodically or closed.

Relay tube 13 has its grid 12 capacitor coupled to plate 5 of tube 4. Grid 12 of relay-tube 13 is also resistor coupled to the high-voltage positive line 8 through resistor 31. If tube 4 is periodically opened, as in the case of the lower light intensity, capacitor 11 is able to charge through resistor 31 each time a positive pulse opens tube 4. The values of resistor 31 and capacitor 11 are chosen so as to have a relatively long time constant; therefore as tube 4 is opened at relatively high frequency, a relatively steady less-positive bias is applied to grid 12 of tube 13 due to the IR drop across resistor 31. The value of the bias thus obtained is such as to limit the flow of current through relay-tube 13 to a relatively small value. The small value of current flowing through tube 13 is unable to overcome the mechanical spring-bias 17 applied to relay-armature 18 and a circuit is made for the high-beam headlight filaments 21 from auto battery 20. Capacitor 22 in shunt with relay coil 16 also increases the time constant of the circuit, so that the relay armature does not chatter while capacitor 11 is partially charging and discharging.

When tube 4 is closed, as in the case of a certain higher intensity of light incident upon element 24, capacitor 11 discharges through resistor 31 and resistor 7 and grid 12 of tube 13 becomes progressively more positive. This increase in positive bias causes tube 13 to draw relatively heavy current and relay coil 16 becomes energized. With relay-coil 16 energized, armature 18 overcomes mechanical-sping bias 17 and comes into engagement with contact 23, thereby making a circuit from the auto battery to the low-beam headlights.

Potentiometer 33 is arranged to function as a dual sensitivity and compensator control. It is arranged between source of negative voltage 34 and ground. Moving tap 35 further from ground will bring $Eg$ the negative D. C. bias applied to grid 3 of tube 4 closer to the cut-off bias for tube 4 and therefore increase the gain and sensitivity.

The eye or pick-up unit which can be placed in any position in the automobile is shown in Fig. 2. It consists of plastic housing 68 which is attached to stand 69 by screw 70. It is pivoted on screw 70 so that it may be adjusted in a vertical plane. A hole is made through stand 69 and housing 68 to allow twin wire 71 from the electronic unit to enter housing 68. One wire from twin wire 71 is connected to one lead 73 from sensitive element 24 at terminal screw 74. The other wire from twin lead 71 is connected to the other wire from the sensitive element 72 at junction screw 75. Sensitive element 24 may be molded in plastic. This molding comprising element 24 and lens 29 is supported on the wall of housing 68 by plastic support 77. Element 24 is placed in the center of the circular disc, so that when mounted in the housing, it is in line with the center point of lens 28. Lens 28 is supported on the front of housing 68. Lens 28 is an inexpensive magnifying-glass type lens. Its focal length is arranged to be greater than the distance between lens 28 and lens 29. All but a rectangular aperture of lens 28 is blacked out by dense black matte paint. A line drawn through the center of this rectangle at right angles to it would pass through the center of lens 29 and through the center of the crystal of cadmium sulfide 24.

The inside of housing 68 is given an irregular (lumpy) surface of lampblack 78. This irregular lampblack surface is also given to the underside of hood 79 which is formed from housing 68.

Housing 68 can be moved up and down in a vertical plane by means of the pivot made by screw 70. When stand 69 is secured, adjustment in the vertical plane is made by loosening screw 70 and moving housing 68 into correct adjustment.

Horizontal adjustment is provided by loosening nut 80 and rotating stand 69 with housing 68 attached until the correct horizontal adjustment is made.

Having thus described my invention and the advantages thereof, I do not wish to be limited to the details herein disclosed, otherwise than as set forth in the claim, but what I claim is:

In apparatus for automatically switching the dual headlight filaments of a vehicle in response to light emanating from a second opposing automobile comprising in combination, a light-sensitive element, said element having the property whereby the amount of conductivity increase of said element is proportional to the value of light intensity incident thereon, electric means coupled to said element comprising a source of negative potential and a potential divider consisting of a resistor and of a light sensitive element to create a negative potential increase, the amount of said negative potential increase being proportional to the value of light intensivty incident upon said element, electronic means coupled to said electric means, including a potentially controlled pulsed tube, said pulsed tube having two effective states of operation in response to two values of negative potential, one value lower than the second value and one value higher than the first value, wherein said first lower value of negative potential is effective in allowing said pulsed tube to open periodically, and said second higher value of negative potential is effective in closing said pulsed tube, means of converting the opening and closing of said pulsed tube into correspondingly amplified differential of lower and higher values of positive potential, a potentially controlled relay actuating tube connected thereto and having a cathode, a grid and a plate, a source of positive potential, a connection between said source of positive potential and said plate, a relay winding in said connection, whereby the current through said relay winding has a further amplified differential of lower and higher current values, said relay winding having an armature mechanically biased to remain in one position in response to said lower value of current and to become energized into another position in response to said higher value of current.

References Cited in the file of this patent
UNITED STATES PATENTS

| | | |
|---|---|---|
| 2,476,389 | Schmidt | July 19, 1949 |
| 2,573,627 | Vanderlip | Oct. 30, 1951 |
| 2,759,124 | Willis | Aug. 14, 1956 |